Feb. 20, 1951  A. E. GUSTAFSON  2,542,665

TREE LIMB SHAKER

Filed Nov. 20, 1945

INVENTOR
A. E. Gustafson
BY
ATTORNEYS

Patented Feb. 20, 1951

2,542,665

UNITED STATES PATENT OFFICE 2,542,665

TREE LIMB SHAKER

Axel E. Gustafson, Modesto, Calif.

Application November 20, 1945, Serial No. 629,843

14 Claims. (Cl. 56—328)

This invention relates generally to a device adapted for use in connection with the harvesting, by shaking, of tree crops, such as walnuts, almonds, or fruit.

In particular the invention is directed to, and it is an object to provide, a tree limb shaker operative by a worker on the ground to engage and impart a sharp blow or shock to a tree limb without injury to the same, and whereby to effectively and quickly shake the crop loose therefrom, thus eliminating the necessity of climbing into the tree by ladder or otherwise, or the knocking of limbs or the trunk with a stick or mallet, respectively, which often injures the tree.

Another object of the invention is to provide a tree limb shaker which is of light weight construction; readily attachable to a pole of any length; easy and practical to use; and having a wholly enclosed mechanism.

A further object of the invention is to provide a novel guide arrangement for the slidable shank of the limb hook which the device includes.

An additional object of the invention is to provide a tree limb shaker which can be readily taken apart for repair or replacement of the parts thereof.

A further object of the invention is to provide a simple and inexpensive device, and yet one which will be exceedingly effective for the purpose for which it is designed.

These objects are accomplished by means of such structure and relative arrangement of parts as will fully appear by a perusal of the following specification and claims.

In the drawings similar characters of reference indicate corresponding parts in the several views.

Figure 1:
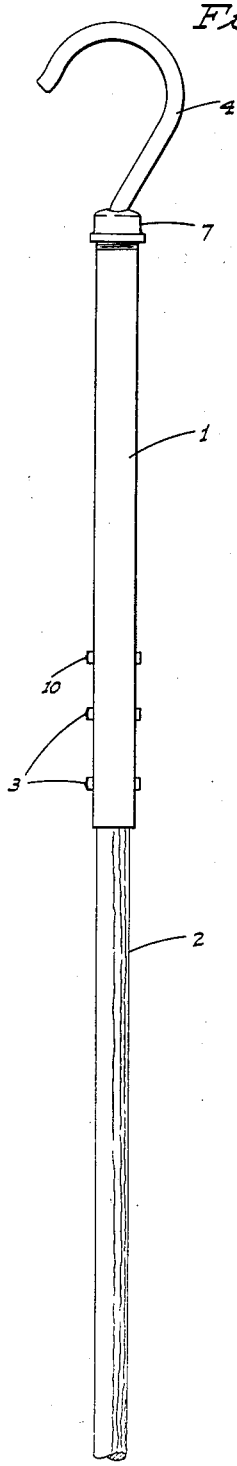
Figure 1 is a side elevation of the device.
Figure 2:
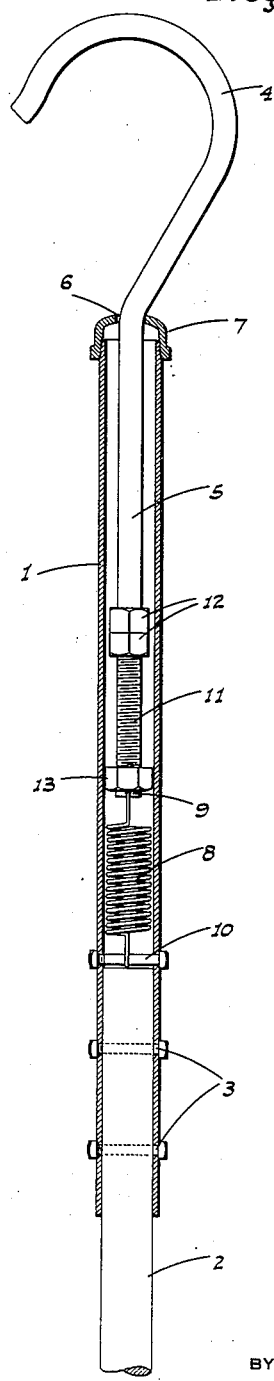
Figure 2 is an enlarged fragmentary sectional elevation of the device showing the hook in retracted position.
Figure 3:
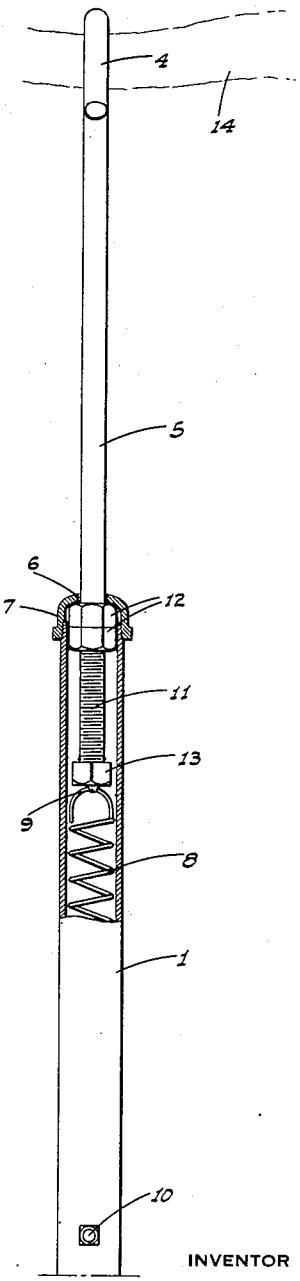
Figure 3 is a similar view, but shows the hook as engaged over a limb, and the position of the parts as the hammer strikes the anvil so as to impart a sharp blow or shock to the tree limb whereby to shake the crop loose therefrom.

Referring now more particularly to the characters of reference on the drawings, the device comprises an elongated tubular sleeve 1 of light-weight material, said sleeve being adapted to engage, at its lower end portion, over the upper end of a relatively long pole 2; the length of the pole 2 being determined by the height of the trees from which the crop is to be harvested. The sleeve 1 and pole 2 are normally but releasably secured together by cross bolts 3.

A limb engaging hook 4 is disposed beyond the upper end of the sleeve 1, with the longitudinal axis of said hook substantially alined with the axis of the sleeve. The hook 4 includes a straight depending shank 5 which slidably extends through a central opening 6 in a cap 7 threaded on the upper end of the sleeve 1, and which cap forms an anvil, as will hereinafter appear.

The straight depending shank 5 extends downwardly in the sleeve 1 some distance but terminates short of the upper end of the pole 2; said shank normally being maintained in retracted position by a normally constantly loaded tension spring 8 disposed within the sleeve 1 and connected between the eye 9 on the lower end of the shank and a cross bolt 10 intersecting the sleeve therebelow.

The lower end portion of the depending shank 5 is threaded, as at 11, and a pair of nuts are run upwardly on said threaded portion to the limit thereof, and locked together, to form a hammer 12. The nuts which form the hammer 12 are of somewhat lesser diameter than the internal diameter of the sleeve 1 whereby to run in clearance relation to the latter.

A guide nut 13 is threaded onto the portion 11 of the shank 5 adjacent its lower end; i. e., directly above the eye 9. The guide nut 13 is multi-sided and of such maximum outside diameter that the points of said nut run in light engagement with the inside of the sleeve 1, so as to guide lineal movement of the shank 5, with a minimum of friction. The shank is, of course, guided at the upper end of the sleeve by the anvil cap 7.

When the above described device is in use a worker on the ground grasps the pole 2 adjacent its lower end and engages the hook 4 over a tree limb 14. Thereafter the worker imparts a rapid downward pull on the pole, causing relative separating movement between the anvil cap 7 and the hook, i. e. sliding movement of the shank 5 through the anvil cap 7. When this occurs the hammer 12 strikes the anvil cap 7 from the inside, producing a sharp blow or shock which is imparted to the limb 14 through the medium of said shank 5 and hook 4. The blow or shock as so imparted to the limb 14 causes the crop, such as nuts or fruit, to break loose from said limb and fall to the ground for recovery.

As the working parts of the device, with the exception of the hook, are normally wholly within the sleeve 1, such parts are thus protected against damage. However, the device may be readily disassembled by removal of the cross bolt 10 and anvil cap 7, if necessary for repair or replacement of parts.

From the foregoing description it will be readily seen that there has been produced such a device as substantially fulfills the objects of the invention as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer.

2. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; the longitudinal axis of the hook and the corresponding axis of the sleeve being in substantial alinement.

3. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; the anvil comprising a cap on the sleeve, the cap having a central opening, and the shank slidably extending through the opening in guided relation.

4. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; the hammer comprising a pair of nuts threaded on the shank at a point normally some distance below the upper end of the sleeve.

5. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; the hammer comprising a pair of nuts threaded on the shank at a point normally some distance below the upper end of the sleeve, and the anvil comprising a cap on the sleeve, the cap having a central opening, and the shank slidably extending through the opening in guided relation.

6. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; there being a pull-back spring in the sleeve connected between the shank and said sleeve.

7. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; there being a loaded tension spring in the sleeve below the shank, said spring being connected at the upper end to the lower end of the shank, and means connecting the spring at the lower end to said sleeve.

8. A three limb shaker as in claim 7 in which said means comprises a removable cross bolt in the sleeve.

9. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; there being a guide element on the shank below the hammer running in the sleeve in shank-guiding relation.

10. A tree limb shaker comprising an elongated sleeve adapted to be secured on the upper end of a pole, a limb engaging hook having a normally retracted shank depending into the sleeve from its upper end, a hammer on the shank, and an anvil on the sleeve in normally spaced relation above the hammer; there being a guide element on the shank below the hammer running in the sleeve in shank-guiding relation, said guide element being a multi-sided nut threaded on the shank.

11. A tree limb shaker comprising an elongated sleeve adapted to be secured on the upper end of a pole, a limb engaging hook having a normally retracted shank depending into the sleeve from its upper end, an anvil cap on the upper end of the sleeve, said cap having a central opening through which the shank slidably extends in guided relation, the lower end portion of the shank being threaded, a pair of nuts threaded on said shank portion and locked together to form a hammer normally spaced below the anvil cap, a cross element in the sleeve below the shank, a loaded pull-back spring connected between the lower end of the shank, and said cross element, and a guide member on the shank below the hammer running in the sleeve in shank-guiding relation.

12. A tree limb shaker as in claim 11 in which said cap is threaded on the sleeve, and said cross element comprises a removable bolt intersecting said sleeve.

13. A tree limb shaker as in claim 11 in which said guide member is a multi-sided nut threaded on the shank below the nuts which form the hammer.

14. A tree limb shaker comprising a pole, an elongated sleeve fixed to the outer end of the pole, a limb engaging hook, a shank on the hook depending into the sleeve, yieldable means normally holding the lower end of the shank adjacent the lower end of the sleeve, an anvil on the outer end of the sleeve, a hammer on the shank, said anvil and hammer being held in relatively spaced relation when the lower end of the shank is held adjacent the lower end of the sleeve, the sleeve being slidable over the shank, the anvil and hammer coming into contact with each other upon longitudinal movement of the sleeve along the shank in a direction away from the hook.

AXEL E. GUSTAFSON.

REFERENCES CITED

The following references are of record in the file of this patent:

UNITED STATES PATENTS

| Number | Name | Date |
|---|---|---|
| 236,581 | Haworth et al. | Jan. 11, 1881 |
| 514,761 | Maggs | Feb. 13, 1894 |
| 1,623,497 | Rurup | Apr. 5, 1927 |
| 1,759,719 | Spino et al. | May 20, 1930 |